United States Patent [19]

Brindell et al.

[11] 4,148,950

[45] Apr. 10, 1979

[54] EPOXY SURFACER CEMENTS CONTAINING POLYAMINE-KETIMINE MIXTURES

[75] Inventors: Gordon D. Brindell, Placentia, Calif.; Richard A. Fraccica, Buffalo, N.Y.

[73] Assignee: Ameron, Inc., Monterey Park, Calif.

[21] Appl. No.: 894,339

[22] Filed: Apr. 7, 1978

[51] Int. Cl.$^2$ .............................................. C08G 59/56
[52] U.S. Cl. ................................ 427/421; 260/18 EP; 528/98; 528/118; 528/120; 528/123; 528/407
[58] Field of Search ................. 528/118, 120, 407, 98, 528/123; 260/18 EP; 428/413; 427/421

[56] References Cited

U.S. PATENT DOCUMENTS

| | | | |
|---|---|---|---|
| 3,032,526 | 5/1962 | Smith et al. | 260/42 |
| 3,291,775 | 12/1966 | Holm | 260/47 |
| 3,322,797 | 5/1967 | Holm | 260/404.5 |
| 3,442,856 | 5/1969 | Floyd | 260/47 |
| 3,547,886 | 12/1970 | Gardner et al. | 260/47 |

Primary Examiner—Harold D. Anderson
Assistant Examiner—E. A. Nielsen

Attorney, Agent, or Firm—Christie, Parker & Hale

[57] ABSTRACT

Room temperature curable epoxy compositions and method are disclosed. The compositions comprise resinous epoxide; a mixed amine-ketimine curing agent comprising a cyclic polyamine having at least two epoxide-reactive, aliphatic amino functional groups, a portion of the amino functional groups in the mixed curing agent being in ketimine form the remainder being in the free amine form; and water in at least about the stoichiometric proportion for hydrolyzing the ketimine groups to the free amine form. The compositions may also comprise inorganic filler such as finely divided silica and sand. The ingredients of the composition are mixed to form a sprayable composition. The working life, or pot life, of the composition can be controlled without excessively affecting the working viscosity or sprayability of the composition by varying the ratio of free amine to ketimine groups in the mixed curing agent and varying the proportion of water in the composition to maintain at least the stoichiometric proportion for hydrolyzing the ketimine groups.

23 Claims, No Drawings

EPOXY SURFACER CEMENTS CONTAINING POLYAMINE-KETIMINE MIXTURES

BACKGROUND

The present invention relates to room temperature curable epoxy coatings, particularly to room temperature curable epoxy compositions for forming thick protective cement coatings on substrates such as steel and concrete. Resinous epoxides are reacted with primary and secondary amines to provide such materials as adhesives, films, cements, floor toppings, highway surfacings, impregnated products such as fiberglass reinforced epoxy laminates and the like.

Epoxy cement compositions ae widely used as protective surfacers on concrete and steel substrates such as walls, ceilings, and floors, reactors, storage tanks, etc. which are exposed to corrosive chemicals. Such surfacer cements usually include inorganic fillers such as finely divided silica and graded silica sand, and are applied in thick coatings of from about 1 to 15 millimeters in thickness.

Room temperature cured chemically resistant epoxy compositions are described in U.S. Pat. No. 3,794,609 to Metil, assigned to the assignee of the present application. The disclosure of the Metil patent is incorporated herein by this reference. The patent describes epoxy compositions comprising resinous epoxide, polyfunctional organic solid amine effective alone as a high temperature curing agent for resinous epoxide, and a solvent for the curing agent which modifies the action of the curing agent to provide room temperature curing. Exemplary amine curing agents are aromatic amines such as metaphenylene diamine, p,p'-methylene dianiline, p,p'-diaminodiphenyl oxide, and other cyclic amino substituted compounds. Such compositions have a reasonable pot or working life, for example, 2½ to 3½ hours, and a reasonable setting time, for example, 8 to 48 hours. Such compositions cure by chemical reaction rather than by release of solvent and hence can be used in a very thick coatings.

U.S. Pat. No. 3,291,775 to Holm, the disclosure of which is incorporated herein by this reference, describes room temperature curing epoxide compositions comprising resinous epoxide and ketimine curing agents. The ketimine curing agents are reaction products of polyamine curing agents and ketones or aldehydes. Such compositions are stable in the absence of moisture but when exposed to moisture, for example, when coated on a substrate exposed to moist air, the compositions absorb moisture. The ketimine groups of the curing agents react with the absorbed moisture to form free amine groups, which then react with the epoxide groups to cure the composition. The described compositions are not desirable as cement surfacer composition because they depend for cure upon absorption of moisture from the atmosphere. Thin films on the order of 0.05 to 0.5 millimeter thick will cure at a reasonable rate by absorption of moisture from the atmosphere. However, such compositions would cure much too slowly, if at all, when applied in thick coatings such as films from about 1 to 15 millimeters in thickness. Moreover, the use of ketimine curing agents alone may not, depending upon the content of inorganic filler, if any, in the composition, provide a composition having sufficient body during its working life for application in thick, sag-free coatings to substantially vertical surfaces. The patent also discloses that in addition to ketimines, accelerators such as water and aliphatic polyamines in minor amounts up to about 3% based on the polyimine curing agent may be employed.

Other ketimine curing agents for epoxy resins are described in U.S. Pat. Nos. 3,386,953, 3,432,574, 3,442,856, 3,401,146 and 3,397,178. U.S. Pat. No. 3,337,606 to Floyd describes epoxy compositions containing long chain aliphatic curing agents having a ketimine group and a nitrile group, and states that water may be included in such compositions to accelerate cure. Example IX of the patent shows water used in stoichiometric proportion to the ketamine group. However, although the curing agents described in the Floyd patent are said to give tough, flexible epoxy coatings, they are not desirable for preparing epoxy cement surfacer compositions that must have high resistance and attack by solvents and corrosive chemicals and high mechanical strength when applied in thick coatings.

SUMMARY OF THE INVENTION

A room temperature epoxy coating composition of the present invention comprises a resinous epoxide, a mixed amine-ketimine curing agent comprising a cyclic polyamine having at least two epoxide-reactive aliphatic amino functional groups, a portion of said aliphatic amino functional groups in said mixed amine-ketimine curing agent being in ketimine group form, the remainder being in free amine form; and water in at least about the stoichiometric proportion for hydrolyzing said ketimine groups to free primary amine form. Preferably, the water is present in minor excess between about 0.8 and about 2 times the stoichiometric proportion. The compositions preferably further comprise an inorganic filler such as finely divided silica or a filler such as finely divided silica or a graded silica sand in amounts of between 1 and about 30 parts by weight per part by weight of resinous epoxide. A method for using such compositions comprises forming a mixture of a resinous spoxide, a mixed amine-ketimine curing agent, water and inorganic filler, applying such mixture in a layer between about 1 and about 15 millimeters thick to a substrate; and allowing said layer to harden. In another embodiment, the working life of such a composition is controlled without undesirably affecting the working viscosity by varying the proportion of free amine to ketimine in the mixed curing agent and varying the proportion of water in the composition to maintain at least about the stoichiometric ratio.

DETAILED DESCRIPTION OF THE INVENTION

Hardenable epoxy compositions of the present invention comprise resinous epoxide, a mixed amine-ketimine curing agent, and water in at least about the stoichiometric proprtion for hydrolyzing the ketimine.

Any resinous epoxide known in the art which can be cured to a solid state by reaction with organic amines may be used in practice of the present invention. Such resins are described in U.S. Pat. Nos. 3,291,775, 3,386,953, 3,442,856, 3,401,146, and 3,397,178, the disclosures of which are incorporated herein by this reference. Useful resinous epoxides are also described in U.S. Pat. No. 3,794,609, and include aliphatic, cycloaliphatic, and aromatic resinous epoxides.

Useful resinous epoxides include the reaction products of polyhydric phenols with polyfunctional halohydrins. Typical polyhydric phenols useful in the preparation of such resins include resorcinol and various bis-phenols resulting from the condensation of phenol with aldehydes and ketones such as formadahyde, acetaldehyde, acetone, methyl ethyl ketone, and the like. A typical epoxy resin of this type includes the reaction products of epichlorohydrin and 2,2-bis(p-hydroxyphenyl) propane (Bisphenol A). Typically, the molecules o the resin have two terminal epoxide groups linked by from 1 to about 10 Bisphenol A units. Another group of epoxy resins are those which are the reaction product of epichlorohydrin and bis(p-hydroxyphenol)sulfone.

Another group of epoxy compounds which may be employed are the glycidyl esters of polymeric fat acids, which are obtained by reacting the polymeric fatty acids with polyfunctional halohydrins such as epichlorohydrin. Such glycidyl ester resinous epoxides have been commercially available. The polymeric fat acids are prepared by the polymerization of unsaturated fatty acids such as soybean, linseed, tung, corn, and safflower oils to provide a mixture of dibasic and higher polymeric fat acids.

Other types of epoxy resins which may be used in the present invention include the polyglycidyl ethers of tetraphenols which have two hydroxy aryl groups at each end of an aliphatic chain. These are obtained by reacting tetraphenols with polyfunctional halohydrins such as epichlorohydrin. The tetraphenols used in preparing the polyglycidyl ethers are known compounds obtained by condensing the appropriate dialdehydes with the desired phenol. Still another group of resinous epoxides are the epoxidized novolac resins which are obtained by reaction of epichlorohydrin with the well known novolac resins. The novolac resins are produced by condensation of a phenol with an aldehyde in the presence of an acid catalyst and then condensing the resulting resin with epichlorohydrin in the presence of an alkali metal hydroxide. Typical tetraphenols include tetrakis(hydroxyphenyl) alkanes such as 1,1,2,2-tetrakis(hydroxyphenyl) ethane, 1,1,4,4-tetrakis(hydroxyphenyl) butane, and the like.

Epoxy resins that are useful in this invention also include epoxidized olefins such as spoxidized polybutadiene and epoxidizecd cyclohexenes, and the diglycidyl ethers of polyalkylene glycols, the preparation of which are described in U.S. Pat. No. 2,923,696, which is incorporated herein by reference.

Epoxy resins having a high content of aromatic groups are preferred for resistance to chemical attack.

In general, the resinous epoxides have more than one epoxide group per molecule, preferably two terminal epoxide groups per molecule. In addition, the resinous epoxides typically have epoxy equivalent weights, that is, the number of grams of resinous epoxide per gram equivalent of epoxide groupm , of between about 140 and 2,000. The epoxy equivalent weight of the resinous epoxide is also defined as the mean molecular weight of the resin divided by the mean number of epoxy radicals per molecule. Resinous epoxides having an epoxy equivalent weights of less than about 140 or more than about 2,000 may also be used in the practice of this invention.

The mixed amine-ketimine curing agents useful in practice of this invention are based upon cyclic polyamines having at leat two aliphatic amino groups that are reactive with epoxide groups of a resinous epoxide, at least one of the amino groups being a primary amino group. By "aliphatic amino group" as the term is used herein is meant an amino group in which the nitrogen neither is a member of an aromatic ring system nor is bonded directly to a carbon that is a member of an aromatic ring. By this definition, the amino group of aminobenzene is "aromatic," whereas the amino group of aminomethylbenzene is "aliphatic." Preferably, the nitrogen of each aliphatic amino group is a member of a ring or is bonded to a ring darbon directly or through a one or two carbon divalent radical. These polyamines may be alicyclic (cycloaliphatic), heterocyclic, and aromatic, and may be saturated or unsaturated and monocyclic, polycyclic, or fused polycyclic. They may also be substituted with various substituents such as ester groups, urethane groups, hydroxyl groups, thio groups, ether groups, halogens, and the like. These cyclic polyamines fall into three broad catagories:

(1) aromatic compounds having at least two aminoalkyl substituents, such as 1,3-bis(aminomethyl) benzene, also called m-xylylene diamine, and 1,4-bis(2-aminoethyl) benzene;

(2) cycloaliphatic compounds including heterocyclic compouns, having at least two amino or aminoalkyl substituents, such as 1,3-bis(aminomethyl) cyclohexane, 1,3-diaminocyclohexane, 3,5,5-trimethyl-3-(aminomethyl)-cyclohexlamine, also called isophorone diamine, N,N'-bis(2-aminoethyl) piperazine, 4,4'-methylene di(-cyclohexylamine), 1,8-diamino-p-menthane, and a polymethylene polycyclohexylamine represented by the structural formula

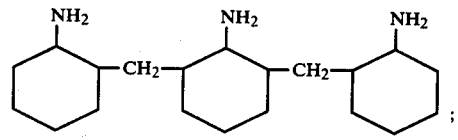

and which can be prepared by condensing aniline with formaldehyde and then by hydrogenating the resulting condensate; and (3) heterocyclic compounds in which the nitrogen of a reactive amino group is part of the ring, such as N-(2-aminoethyl) piperazine, in which one ring nitrogen is a secondary amine and hence reactive with epoxides.

The preferred polyamine curing agents provide relatively rigid, short cross-links in epoxy compositions, giving hard, dense cured compositions that are resistant to solvents, chemical attack, and discoloration and have excellent mechanical strength and durability.

The mixed amine-ketimine curing agent of the present invention comprises a cyclic polyamine as described above or a mixture of such cyclic polyamines. In the mixed amine-ketamine curing agent, a portion of the amino functional groups of the cyclic polyamine are in ketamine form and the remainder of the amino functional groups are in free amine form before the components of the epoxy compositions of the present invention are mixed and allowed to react. The amino functional groups in ketimine form and in free amine form may be distributed in a variety of ways among the molecules of cyclic polyamine that constitute the mixed amine-ketimine curing agent. Thus, some molecules of the cyclic polyamine may have both amino groups in ketimine form; some may have one amino group in ketimine form and one amino group in free amino form; and some may have both amino groups in free amine form. Since only primary amines can be converted to ketimine form, a cyclic polyamine having only one primary amino functional group and one secondary amino functional group can have only one of its amino groups in ketimine form. When mixtures of cyclic polyamines are used, one type of polyamine may be largely in ketimine form while another type is largely in free amine form. The mole ratio of ketimine groups of free amine groups in the mixed amine-ketimine curing agent as a whole is more important than the distribution of such groups among the molecules constituting the curing agent.

The mixed amine-ketimine curing agent may be prepared from the described cyclic polyamines in at least two ways. In one approach a portion of the cyclic polyamine is reacted with a ketone as described below to convert substantially all or a great proportion of the primary amino groups of the cyclic polyamine to the ketimine form. The resulting cyclic ketimino compound is then mixed with unreacted cyclic polyamine in a proportion that provides the desired ratio of ketimine group to free amine groups. In another approach, cyclic polyamine is reacted to a predetermined extent with a ketone to produce directly a mixture of reaction products having the desired ratio of ketimine groups to free amine groups. The mixed reaction product thus obtained is employed as the mixed amine-ketimine curing agent in accordance with practice of this invention.

When a cyclic polyamine having two primary amino groups, such as m-xylylene diamine, is reacted with a ketone, the reaction product may comprise a mixture of unreacted polyamine, monoketimine, and diketimine products. Such a mixed product may have the desired ratio of ketimine groups to free amine groups, or it may be blended with unreacted amino compound to produce a mixed amine-ketimine curing agent having the desired ratio. Such mixtures are included in the meaning of the term "mixed amine-ketimine curing agent" as the term is used herein.

If desired, the mixed amine-ketimine curing agent may be a single compound in which substantially all of the molecules of the compound have at least one ketimine group and at least one free amine group. Such a compound may be made by partially reacting a diamino compound, for example, m-xylylene diamine, with a ketone and purifying the resulting mixture of products to obtain a pure product having one amino group and one ketimino group per molecule. Such a compound is also included within the meaning of the term "mixed amine-ketimine curing agent" as the term is used herein.

Cyclic polyamines useful in practice of this invention have at least one primary aliphatic amino functional group. To form the mixed amine-ketimine curing agent, at least a portion of the primary amine groups of the cyclic polyamine are reacted with a ketone to convert the primary amine groups to the ketimine form. The ketimine forming reaction is well known and is described for example in the above mentioned U.S. Pat. Nos. 3,386,953, 3,442,856, 3,401,146, 3,397,178, 3,432,574, and 3,291,775. See particularly U.S. Pat. No. 3,291,775 which describes the reaction of m-xylylene diamine with methyl isobutyl ketone to produce N,N-di(4-methyl-2-pentylidene) m-xylylene diamine.

Ketones useful in the preparation of ketimines for use in practice of the present invention include dialkyl, diaryl, and alkylaryl ketones having a total of 3 to about 13 carbons. Specific examples include acetone, methyl ethyl ketone, methyl n-butyl ketone, methyl isobutyl ketone, methyl isoamyl ketone, methyl amyl ketone, ethyl isoamyl ketone ethyl amyl ketone, acetophenone, and benzophenons. Preferred are methyl isobutyl ketone and methyl isoamyl ketone.

Mixed amine-ketimine curing agents for use in practice of this invention comprise cyclic polyamines having amino groups in ketimine form and amino groups in free amin form. Amino groups in ketimine form are included within the term "amino functional groups" as the term is used herein. At least about one mole percent of the amino functional groups in the mixed amine-ketimine curing agent are in ketimine group form. For example, from about 10 to 90 mole percent of the epoxide reactive amino functional groups may be in ketimine form. Preferably, from about 25 to 75 mole percent of the amino functional groups are in the ketimine form. The proportion of free amine to ketimine may be varied to provide a composition hhaving a working life in the range of from about 1 to 8 hours, desirably at least about 2 hours for sprayable compositions.

the use of a mixed amine-katamine curing agent has a number of benefits. The free aliphatic amino functional groups react quickly with the resinous epoxide when the composition is mixed to provide a sprayable composition that has sufficient body for application to substantially vertical surfaces in thick layers, such as layers of from about 1 to 15 millimeters or more in thickness. The amino functional groups in ketimine form do not participate in the curing reactions until they are hyrolyzed to the free maine form by the water included in the composition. Thus the amino functional groups in ketimine form have a delayed curing action which gives the composition adequate working life. By varying the proportion of ketimine groups to free amine groups in the mixed amine ketimine curing agent, compositions having the desired body and working life for a particular application may readily be formulated.

To provide complete cure of thick coatings, compositions of the present invention include water in at least about the stoichiometric proportion for hydrolyzing ketimine groups in the mixed amine-ketimine curing agent to the free amine form, that is, at least about 0.8 mole of water per mole of ketimine group present. It is preferable to employ more than the stoichiometric amount of water to assure a more rapid and complete cure. Quantities of water in excess of the stoichiometric proportion, for example, between about 1 and 2 times the stoichiometric proportion, may be used. The incorporation of at least about the stoichiometric proportion of water provides compositions which cure independently of atmospheric moisture. Such compositions cure uniformly even when applied in thick coatings and thus achieve mechanical strength in depth more quickly than compositions which cure from the exposed surface inwardly by absorption of moisture from the air.

During the curing process the water hydrolyzes the ketimine groups in the curing agent to produce free amine groups and the ketone from which the ketimine groups were formed. The ketone thus liberated may in part evaporate from the cured coating and in part remain within the cured coating. The presence of such ketone in the cured composition does not appear to deleteriously affect the solvent resistance, the chemical resistance, or the mechanical strength of the cured composition.

Preferably, compositions of the present invention also include an inorganic filler, for example, graded silica sand, finely divided silica such as fumed ilica or precipitated silica, and barium sulfate. The fillers contribute to the body or working consistency of the composition during its working life, lower the cost of the composition, provide a non-slip surface, and improve the strength of the cured composition. Finely divided silica filler may be included in amouns of from about 1 to 5 parts per part of resinous epoxide. Inorganic filler such as sand may be included in amounts from about 1 to about 30 parts per part of resinous epoxide. Pigments or colorants may also be included.

Compositions of the present invention preferably also include accelerators such as phenol, aliphatic polyamines, mercaptans, acids, and the like. The solvents disclosed in U.S. Pat. No. 3,794,609 may also be included. Such solvents include ethers such as butyl glycidyl ether, cresyl glycidyl ether, and allyl glycidyl ether; alcohols such as isopropyl alcohol, benzyl alcohol, furfuryl alcohol, tetrahydrofurfuryl alcohol, and furfuryl alcohol polymers; and low viscosity organic solvents containing epoxy groups such as styrene oxide, propolene oxide, and epichlorohydrin in minor amounts of up to about 1 part per ten parts of resinous epoxide. Organic solvents such as methyl isobutyl ketone, acetone, and petroleum hydrocarbons may also be included in minor amounts.

The following example illustrates a composition of the present invention:

EXAMPLE I

The following composition includes three components, a liquid resin component, a curing agent component, and a filler component. Before the composition is mixed for use, the components are kept in separate containers. If desired, the filler component may be mixed with the liquid resin component or with the curing agent component for storage.

| Resin Component | | |
|---|---|---|
| Araldite 6004 Epoxy Resin[1] | 94.4 | grams |
| Water | 2.1 | grams |
| Curing Agent Component | | |
| m-Xylene diamine (MXDA) | 8.0 | grams |
| Ketimined MXDA and methyl isobutyl ketone | 17.7 | grams |
| Powder Component | | |
| Ground Silica | 70.0 | grams |

[1]Supplied by Ciba Geigy, epoxide equivalent = 175, viscosity = 4000 cps.

The three components were combined and stirred by hand for one minute. In this composition, the mole ratio of water to ketimine groups is about 1.1 to 1. The following properties were determined for the mixture upon mixing and curing at about 73° F.

Pot Life: 1½ hours
Set Hard: 9½–11 hours
Compressive Strength (after 7 day cure): 8802 psi

EXAMPLE II

| | A | | B | | C | |
|---|---|---|---|---|---|---|
| Epon 828 Epoxy Resin[1] | 100.0 | grams | 100.0 | grams | 100.0 | grams |
| Ketimine of 1,3-Bis (aminoethyl) cyclohexane and methyl n-butyl ketone | 40.7 | grams | — | | — | |
| 1,3-Bis (aminoethyl) cyclohexane | — | | 18.9 | grams | 18.9 | grams |
| Methyl n-butyl ketone | — | | 26.8 | grams | — | |
| Furfuryl alcohol | — | | — | | 26.8 | grams |
| Water | 5.0 | grams | — | | — | |

[1]Epoxy resin supplied by Shell Chemical, epoxide equivalent = 195, viscosity = 16,000 cps The ingredients of each formulation were stirred together to form a uniform mixture and the gel time of each was determined.

| | A | B | C |
|---|---|---|---|
| Gel time, 73° F | 3 hours | 1 ½–2 hrs. | ½ hour |

A comparison of the gel time of Formulation A, which contains only a ketimine curing agent, with the gel times of Formulation B and C, which contain the corresponding free amine curing agent, shows that a wide variation in gel time can be achieved by varying the proportion of ketimine and free amine in the curing agent.

EXAMPLE III

| Resin Component | | |
|---|---|---|
| Araldite 6004 | 70.5 | grams |
| Carbon black pigment paste | 2.9 | " |
| Asbestos (a thickener) | 2.1 | " |
| Water | 2.3 | " |
| Curing Agent Component | | |
| m-Xylylene Diamine (MXDA) | 4.6 | " |
| ketimine of MXDA and methyl isobutyl ketone | 23.5 | " |
| Powder Component | | |
| Graded Sand | 380 | " |

The components were mixed and allowed to stand at about 73° F. The mole ratio of water to ketimine groups is 0.82 to 1.

Pot Life: 1½ hours

A similar composition was prepared in which all of the MXDA was in free amine form. The pot life was 20 minutes. When all of the MXDA was in ketimine form, the pot life was 5–8 hours.

In formulating a composition of this invention for a particular use, it is preferable to adjust the ratio of free amine to ketimine to provide a pot life that is sufficient but not excessive, so that the time required for hard setting will not be unduly prolonged.

EXAMPLE IV

The following composition includes a mixed curing agent having a free polyamine and a ketimine of a different polyamine.

| Resin Component | | |
|---|---|---|
| Araldite 6004 | 70.5 | grams |
| Water | 2.3 | |
| Curing Agent Component | | |
| m-Xylylene Diamine | 4.6 | |
| Ketimine of 1,3-Bis (aminoethyl) cyclohexane and methyl isobutyl ketone | 24.0 | |
| Powder Component | | |
| Graded silica sand | 380.0 | |

The composition was mixed and allowed to cure at about 73° F.

Pot Life: 1¾ hours
Set Hard: approximately 16 hours
Compressive Strength (after 7 day cure): 7825 psi The present invention has been described with reference to particular details and embodiments thereof. These particulars are intended to illustrate rather than to limit the invention, the scope of which is defined in the following claims.

What is claimed is:

1. A room temperature hardening epoxy cement composition comprising:
   (1) an epoxy resin;
   (2) a mixed amine-ketimine curing agent comprising a cyclic polyamine having at least two aliphatic amino functional groups reactive with the epoxy resin, a portion of said aliphatic amino functional groups in said mixed amine-ketimine curing agent being in ketimine group form; and
   (3) water in at least about the stoichiometric proportion for hydrolyzing said ketimine groups to free primary amine form.

2. The composition of claim 1 in which said ketimine groups are the reaction product of primary amine functional groups of said cyclic amino compound and a dialkyl ketone, a diaryl ketone, or an alkyl aryl ketone having three to thirteen carbon atoms.

3. The composition of claim 1 further comprising between about 5 and about 30 parts by weight per part of weight of epoxy resin of inorganic filler.

4. A composition of claim 1 in whcih the cyclic polyamine is an aromatic compound having at least two epoxide reactive aminoalkyl substituents.

5. The composition of claim 4 in which the cyclic polyamine is 1,3-bis(aminomethyl) benzene.

6. The composition of claim 1 in which the cyclic polyamine is a cycloaliphatic compound having at least two epoxide-reactive amino or aminoalkyl substituents.

7. The composition of claim 5 in which the cyclic polyamine is 1,3-bis(aminomethyl) cyclohexane.

8. The composition of claim 6 in which the cyclic polyamine is p,p'-methylene di(cyclohexylamine).

9. The composition of claim 6 in which the cyclic polyamine is 1,3-diaminocyclohexane.

10. The composition of claim 1 in which the cyclic polyamine is N-(2-aminoethyl)piperazine.

11. The composition of claim 6 in which the cyclic polyamine is 3,5,5-trimethyl-3-(amino methyl)cyclohexylamine.

12. The composition of claim 6 in which the cyclic polyamine is 1,8-diamino-p-methane.

13. The composition of claim 1 in which the cyclic polyamine compound is a heterocyclic compound in which the nitrogen of an epoxide reactive amino functional group is part of the ring.

14. The composition of claim 11 in which the cyclic polyamine is N-(2-aminoethyl)piperazine.

15. The composition of claim 2 in which the ketone is methyl isobutyl ketone.

16. The composition of claim 2 in which the ketone is methyl isoamyl ketone.

17. The composition of claim 1 in which between about 10 and about 90 mole percent of said aliphatic amino functional group in said mixed amine-ketimine curing agent are in ketimine form.

18. A method of forming a protective epoxy cement surface on a substrate which comprises:
   forming a mixture of (a) an epoxy resin;
   (b) a mixed amine-ketimine curing agent comprising a cyclic polyamine having at least two aliphatic amino functional groups reactive with the epoxy resin, a portion of said aliphatic amino functional groups in said mixed amine-ketimine curing agent being in ketimine group form;
   (c) water in at least about the stoichiometric amount for hydrolyzing said ketimine groups to free amine form; and
   (d) between about 5 and about 30 parts by weight per part by weight of epoxy resin of inorganic filler;
   applying said mixture in a layer between about 1 and about 15 millimeters thick to said substrate; and allowing said layer to harden.

19. The method of claim 18 comprising the steps of forming said mixture and allowing said mixture to react partially to produce a sprayable cement composition having sufficient body for forming a sag-free layer between about 1 and about 15 millimeters thick on a substantially vertical surface, and applying said sprayable composition to said substrate.

20. The method of claim 18 in which the cyclic polyamine is an aromatic compound having at least two epoxide-reactive aminoalkyl substituents.

21. The method of claim 18 in which the cyclic polyamine is a cycloaliphatic compound having at least two epoxide-reactive amino or aminoalkyl substituents.

22. The method of claim 18 in which the cyclic polyamine is a heterocyclic compound in which the nitrogen of an epoxide-reactive amino functional group is a member of the ring.

23. The method of claim 18 comprising the steps of controlling the ratio of amino functional groups in ketimine form to amino functional groups in free amine form for regulating the working life of the mixture.

* * * * *

UNITED STATES PATENT AND TRADEMARK OFFICE
CERTIFICATE OF CORRECTION

PATENT NO. : 4,148,950
DATED : April 10, 1979
INVENTOR(S) : GORDON D. BRINDELL and RICHARD A FACCICA It is certified that error appears in the above-identified patent and that said Letters Patent are hereby corrected as shown below:

Abstract, line 7, after "form" insert --,--
Col. 1, line 15, "ae" should read --are--; line 28, before "polyfunc-" insert --a--; line 41, cancel "a"; line 56, "position" should read --positions--
Col. 2, line 36, after "between" insert --about--; line 39, "spoxide" should read --epoxide--; line 55, "proprtion" should read --proportion--
Col. 3, line 6, "o" should read --of--; line 28, "dialdehydes" should read --dialdehyde--; line 41, "spoxidized" should read --epoxidized--; line 42, "epoxidizecd" should read --epoxidized--; line 53, "groupm ," should read --group,--; line 57, cancel "an"
Col. 4, line 6, "darbon" should read --carbon--; line 20, "compouns" should read --compounds--; line 62, "amino", second occur., should read --amine--
Col. 5, line 3, "of", second occur., should read --to--; line 66, after "ketone", second occur., insert --,--
Col. 6, line 4, "amin" should read --amine--; line 14, "hhaving" should read --having--; line 17, "the" should read --The--; line 25, "hyrolyzed" should read --hydrolyzed--; line 26, "maine" should read --amine--; line 31, "amine ketimine" should read --amine-ketimine--; line 64, "ilica" should read --silica--
Col. 7, line 2, "amouns" should read --amounts--; line 16, "propo-" should read --propy- --; line 38, "m-Xylene" should read --m-Xylylene--; line 42, "eps." should read --cps.--
Example II, line 4, "(aminoethyl)" should read --(aminomethyl)--; line 7, "(aminoethyl)" should read --(aminomethyl)--
Col. 8, line 50, "(aminoethyl)" should read --(aminomethyl)--

UNITED STATES PATENT AND TRADEMARK OFFICE
CERTIFICATE OF CORRECTION

PATENT NO. : 4,148,950
DATED : April 10, 1979
INVENTOR(S) : GORDON D. BRINDELL and RICHARD A. FRACCICA It is certified that error appears in the above-identified patent and that said Letters Patent are hereby corrected as shown below:

Col. 9, line 31 (Claim 3, line 3), "of", first occur., should read --by--; line 33 (Claim 4, line 1), "whcih" should read --which--; line 50 (Claim 11, line 2),"(amino methyl)" should read --(aminomethyl)--; line 53 (Claim 12, line 2), "methane" should read --menthane--

Signed and Sealed this

Thirtieth Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,148,950
DATED : April 10, 1979
INVENTOR(S) : GORDON D. BRINDELL & RICHARD A. FRACCICA It is certified that error appears in the above-identified patent and that said Letters Patent are hereby corrected as shown below:

Col. 4, line 50, "amine-ketamine" should read -- amine-ketimine --
Col. 4, line 52, "ketamine" should read -- ketimine --

Signed and Sealed this

Twenty-fifth Day of May 1982

[SEAL]

Attest:

GERALD J. MOSSINGHOFF

*Attesting Officer*   *Commissioner of Patents and Trademarks*